US011765592B2

(12) United States Patent
Omote et al.

(10) Patent No.: US 11,765,592 B2
(45) Date of Patent: Sep. 19, 2023

(54) IN-VEHICLE DEVICE TO CONNECT TO INFORMATION TERMINAL AND IN-VEHICLE SYSTEM

(71) Applicant: Panasonic Intellectual Property Management Co., Ltd., Osaka (JP)

(72) Inventors: Yusuke Omote, Kanagawa (JP); Michihiro Kitagawa, Kanagawa (JP); Yoshinobu Kitagawa, Kanagawa (JP); Tomohiko Nakajo, Tokyo (JP); Toshiaki Ikematsu, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 373 days.

(21) Appl. No.: 17/195,119

(22) Filed: Mar. 8, 2021

(65) Prior Publication Data

US 2021/0276584 A1 Sep. 9, 2021

(30) Foreign Application Priority Data

Mar. 9, 2020 (JP) ................................. 2020-039930

(51) Int. Cl.
*H04W 12/37* (2021.01)
*B60W 50/14* (2020.01)
(Continued)

(52) U.S. Cl.
CPC ............ *H04W 12/37* (2021.01); *B60W 50/14* (2013.01); *H04W 4/40* (2018.02); *H04W 4/48* (2018.02);
(Continued)

(58) Field of Classification Search
None
See application file for complete search history.

(56) References Cited

U.S. PATENT DOCUMENTS 9,426,647 B2 * 8/2016 Geng .................... H04W 12/48
9,469,304 B2 * 10/2016 Morita ............. B60W 50/0098
(Continued)

FOREIGN PATENT DOCUMENTS

CN 101527911 A * 9/2009 ......... H04L 63/0428
CN 101527911 B * 8/2012 ......... H04L 63/0428
(Continued)

*Primary Examiner* — Kevin R Steckbauer
(74) *Attorney, Agent, or Firm* — Greenblum & Bernstein, P.L.C.

(57) ABSTRACT

A communication interface can connect to an information terminal. When detecting the connection between the communication interface and the information terminal, a verification interface verifies the security status of the information terminal. When there is no problem in the security status of the information terminal verified by the verification interface, a display displays an image based on an image signal received by the communication interface from the information terminal. The operation interface accepts an operation on the image displayed by the display. The communication interface transmits an operation signal responsive to the operation accepted by the operation interface to the information terminal, and then receives an image signal as a result of processing by the information terminal in accordance with the operation signal from the information terminal.

11 Claims, 11 Drawing Sheets

START
S10 CONNECT TO INFORMATION TERMINAL? (N / Y)
S12 IS THERE NO PROBLEM WITH SECURITY STATUS? (N / Y)
S14 RECEIVE IMAGE SIGNAL
S16 DISPLAY IMAGE
S18 HAS OPERATION BEEN PERFORMED? (N / Y)
S20 SEND OPERATION SIGNAL
S22 RECEIVE IMAGE SIGNAL
S24 DISPLAY IMAGE
END

(51) Int. Cl.

| | |
|---|---|
| ***H04W 12/06*** | (2021.01) |
| ***H04W 4/80*** | (2018.01) |
| ***H04W 4/40*** | (2018.01) |
| ***H04W 4/48*** | (2018.01) |

(52) U.S. Cl.

CPC ............ *H04W 4/80* (2018.02); *H04W 12/06* (2013.01); *B60K 2370/1438* (2019.05); *B60K 2370/52* (2019.05); *B60K 2370/563* (2019.05); *B60K 2370/569* (2019.05); *B60K 2370/573* (2019.05); *B60K 2370/589* (2019.05); *B60W 2050/146* (2013.01)

(56) References Cited

U.S. PATENT DOCUMENTS

| | | | | |
|---|---|---|---|---|
| 9,718,397 | B2 * | 8/2017 | Kalanick | G06Q 50/30 |
| 9,892,637 | B2 * | 2/2018 | Demisse | G08G 1/017 |
| 10,122,398 | B2 * | 11/2018 | Lokasaari | H04W 48/18 |
| 10,169,987 | B1 * | 1/2019 | Demisse | G08G 1/017 |
| 10,249,184 | B2 * | 4/2019 | Demisse | G06Q 50/30 |
| 10,387,028 | B2 * | 8/2019 | Matsumoto | G06F 3/0488 |
| 10,484,360 | B2 * | 11/2019 | Winkelvos | H04L 9/0825 |
| 10,672,265 | B2 * | 6/2020 | Demisse | H04W 4/44 |
| 11,126,704 | B2 * | 9/2021 | Yang | H04W 12/08 |
| 11,170,085 | B2 * | 11/2021 | Devine | G06F 21/32 |
| 2006/0084472 | A1 * | 4/2006 | Park | H04W 88/02 455/411 |
| 2010/0037057 | A1 * | 2/2010 | Shim | H04W 12/069 726/4 |
| 2014/0092047 | A1 * | 4/2014 | Nara | G06F 3/1454 345/173 |
| 2015/0178034 | A1 * | 6/2015 | Penilla | G06F 3/167 345/1.1 |
| 2015/0339334 | A1 * | 11/2015 | Hanke | H04L 67/10 707/736 |
| 2016/0316367 | A1 * | 10/2016 | Rose | H04B 5/0056 |
| 2016/0378961 | A1 * | 12/2016 | Park | G06F 21/36 726/19 |
| 2020/0118422 | A1 * | 4/2020 | Demisse | G08G 1/017 |
| 2021/0276584 | A1 * | 9/2021 | Omote | H04W 12/06 |
| 2022/0132315 | A1 * | 4/2022 | Kolekar | H04L 63/205 |

FOREIGN PATENT DOCUMENTS

| | | | | | |
|---|---|---|---|---|---|
| CN | 106494327 | A | * | 3/2017 | B60K 35/00 |
| CN | 107396281 | A | * | 11/2017 | |
| CN | 107465995 | A | * | 12/2017 | H04W 4/80 |
| CN | 107659407 | A | * | 2/2018 | H04L 63/0823 |
| CN | 107920784 | A | * | 4/2018 | G06F 21/32 |
| CN | 106494327 | B | * | 6/2019 | B60K 35/00 |
| CN | 110121710 | A | * | 8/2019 | G06Q 20/127 |
| CN | 111193693 | A | * | 5/2020 | B60R 25/01 |
| CN | 114697925 | A | * | 7/2022 | |
| CN | 110519754 | B | * | 1/2023 | H04M 1/72448 |
| EP | 3277011 | B1 | * | 9/2021 | H04L 63/0823 |
| JP | 2006129083 | A | * | 5/2006 | H04L 63/107 |
| JP | 4724405 | B2 | * | 7/2011 | H04L 63/107 |
| JP | 2016-077014 | | | 5/2016 | |
| JP | 6023364 | | | 11/2016 | |
| JP | 2021141534 | A | * | 9/2021 | B60W 50/14 |
| WO | WO-2020150701 | A1 | * | 7/2020 | H04L 63/205 |
| WO | WO-2022075498 | A1 | * | 4/2022 | |

* cited by examiner

FIG.3A

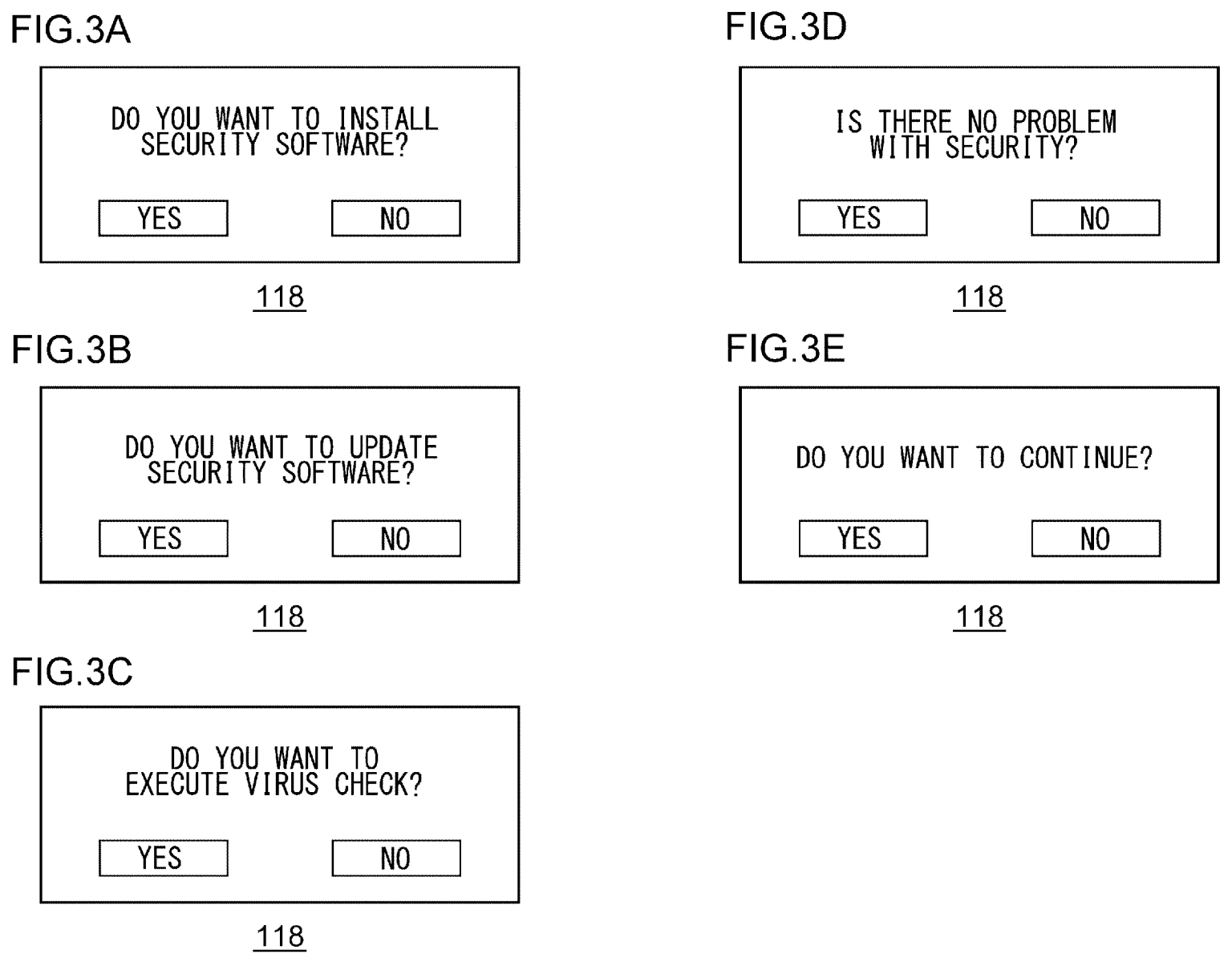

DO YOU WANT TO INSTALL SECURITY SOFTWARE?

YES NO

DO YOU WANT TO UPDATE SECURITY SOFTWARE?

YES NO

DO YOU WANT TO EXECUTE VIRUS CHECK?

YES NO

IS THERE NO PROBLEM WITH SECURITY?

YES NO

DO YOU WANT TO CONTINUE?

YES NO

118

CONNECTING

CONNECT-
ING

118

318

CONNECTING

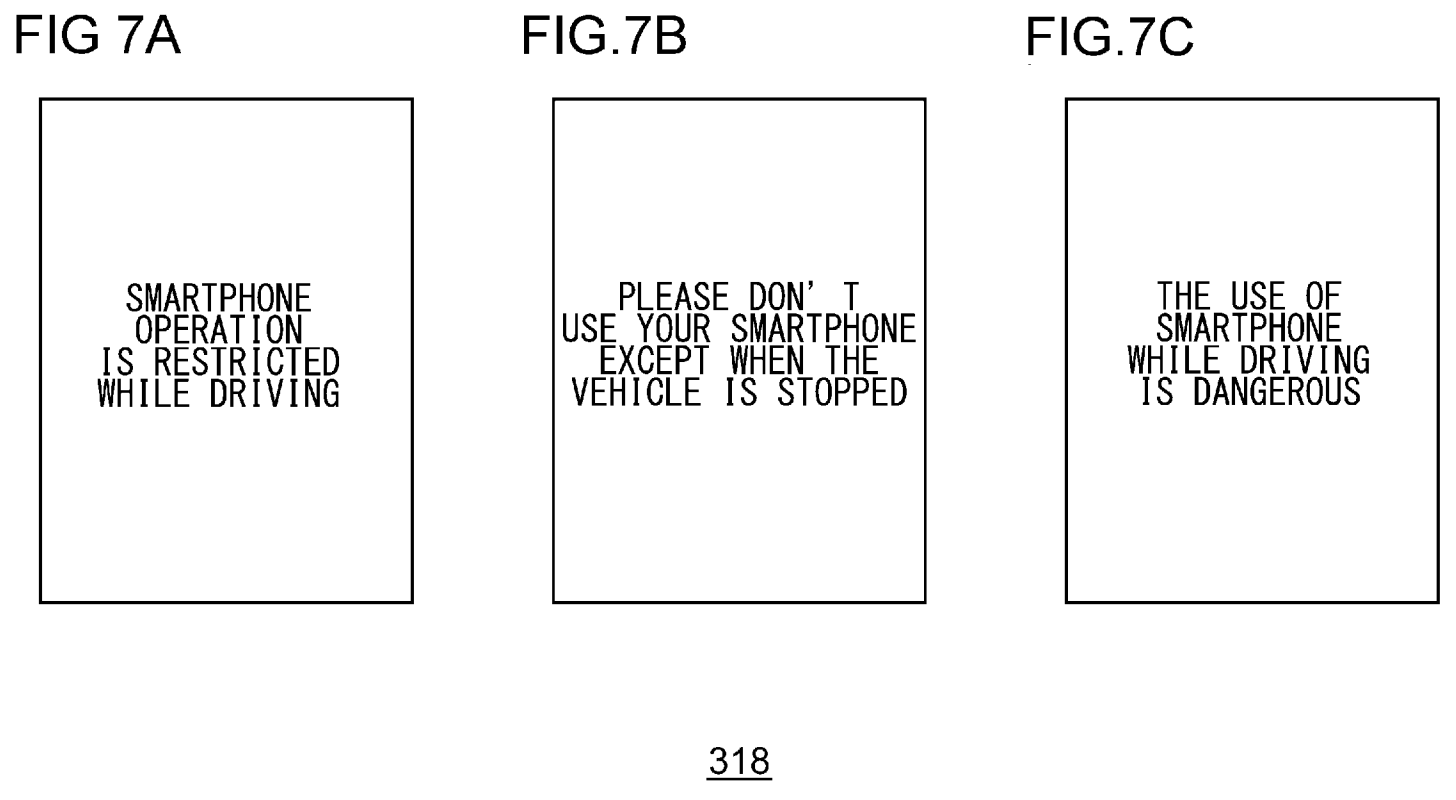

SMARTPHONE
OPERATION
IS RESTRICTED
WHILE DRIVING

FIG.7B

PLEASE DON' T
USE YOUR SMARTPHONE
EXCEPT WHEN THE
VEHICLE IS STOPPED

FIG.7C

THE USE OF
SMARTPHONE
WHILE DRIVING
IS DANGEROUS

318

118

118

IN-VEHICLE DEVICE TO CONNECT TO INFORMATION TERMINAL AND IN-VEHICLE SYSTEM

BACKGROUND

1. Field

The present disclosure relates to a connection technique, and more particularly to an in-vehicle device to connect to an information terminal, and an in-vehicle system.

2. Description of the Related Art

When information displayed on the screen of an information terminal is transmitted to an in-vehicle device, the information is displayed on the screen of the in-vehicle device. However, when the in-vehicle device is controlled from the information terminal to provide a display on the screen of the in-vehicle device, if the information on the screen of the information terminal is directly displayed on the screen of the in-vehicle device, it may be hard for the user to see the information. Conventionally, the in-vehicle device transmits screen resolution information to the information terminal, and the information terminal generates screen information to be displayed on the in-vehicle device based on the resolution information and transmits it to the information terminal (for example, see JP 2016-77014 A).

Connecting an in-vehicle device and an information terminal requires ensuring safety.

SUMMARY

The present disclosure has been made in view of such circumstances, and an object of the present disclosure is to provide a technique for ensuring safety of connection between an in-vehicle device and an information terminal.

In order to solve the above-mentioned issue, an in-vehicle device in an aspect of the present disclosure includes: a communication interface connectable to an information terminal; a verification interface that verifies security status of the information terminal when detecting connection between the communication interface and the information terminal; a display that displays an image based on an image signal received by the communication interface from the information terminal when there is no problem in the security status of the information terminal verified by the verification interface; and an operation interface that receives an operation on the image displayed by the display. The communication interface transmits an operation signal responsive to the operation accepted by the operation interface to the information terminal, and then receives an image signal as a result of processing by the information terminal in accordance with the operation signal from the information terminal.

Another aspect of the present disclosure is an in-vehicle system. This in-vehicle system includes an information terminal and an in-vehicle device. The in-vehicle device includes: a communication interface connectable to the information terminal; a display that, when the information terminal connects to the communication interface, displays an image based on an image signal received by the communication interface from the information terminal; and an operation interface that accepts an operation on the image displayed by the display. The communication interface transmits an operation signal responsive to the operation accepted by the operation interface to the information terminal, and then receives an image signal as a result of processing by the information terminal in accordance with the operation signal from the information terminal. When the communication interface and the information terminal are connected, at least one of the display and the information terminal displays a connection notification.

Yet another aspect of the disclosure is also an in-vehicle system. This in-vehicle system includes an information terminal and an in-vehicle device. The in-vehicle device includes: a communication interface connectable to the information terminal; a display that, when the information terminal connects to the communication interface, displays an image based on an image signal received by the communication interface from the information terminal; and an operation interface that accepts an operation on the image displayed by the display. The communication interface transmits an operation signal responsive to the operation accepted by the operation interface to the information terminal, and then receives an image signal as a result of processing by the information terminal in accordance with the operation signal from the information terminal. The information terminal displays a notification for informing a restriction on an operation during running of a vehicle.

Yet another aspect of the disclosure is also an in-vehicle system. This in-vehicle system includes an information terminal capable of executing a first application and a second application that are different from each other, and an in-vehicle device. The in-vehicle device includes: a communication interface connectable to the information terminal; a display that, when the information terminal connects to the communication interface, displays an image based on an image signal received by the communication interface from the information terminal and resulting from processing of the first application by the information terminal; and an operation interface that accepts an operation on the image displayed by the display. The communication interface transmits an operation signal responsive to the operation accepted by the operation interface to the information terminal, and then receives an image signal resulting from processing of the first application by the information terminal in accordance with the operation signal from the information terminal. The display does not display an image based on an image signal resulting from processing of the second application by the information terminal.

It should be noted that any combination of the above-described components and mutual exchanges of methods, devices, systems, recording media, computer programs and the like described in relation to the present disclosure are also effective as aspects of the present disclosure.

BRIEF DESCRIPTION OF THE DRAWINGS

FIGS. 3A-3E are diagrams showing screens displayed on the display of FIG. 2;

FIGS. 7A-7C are diagrams showing screens displayed on a display in a third example;

DETAILED DESCRIPTION

The invention will now be described by reference to the preferred embodiments. This does not intend to limit the scope of the present invention, but to exemplify the invention.

First Example

The present disclosure will be briefly discussed before specific description is presented. A first example of the present disclosure relates to an in-vehicle system including an in-vehicle device mounted in a vehicle and an information terminal connected to the in-vehicle device. An example of the in-vehicle device is an electronic device such as a navigation device, and an example of the information terminal is a smartphone. For example, the in-vehicle device executes a navigation function and displays route guidance on a monitor together with map information. In addition, various applications are installed in the information terminal, and the information terminal displays a screen of the execution result of any of the applications on the monitor. The monitor of the in-vehicle device is generally larger than the monitor of the information terminal. Therefore, when the user exists in the vehicle, displaying the screen of the application executed in the information terminal on the monitor of the in-vehicle device would improve user convenience. In order to realize this, the in-vehicle device and the information terminal are connected together wirelessly or by wire. If the safety of any application or the like in the information terminal is not verified, a software virus contained in the information terminal may invade the in-vehicle device when the information terminal is connected to the in-vehicle device. In the present example, in order to ensure the safety of connection between the in-vehicle device and the information terminal, the in-vehicle device connects to the information terminal after verifying the security status of the information terminal.

Figure 1:
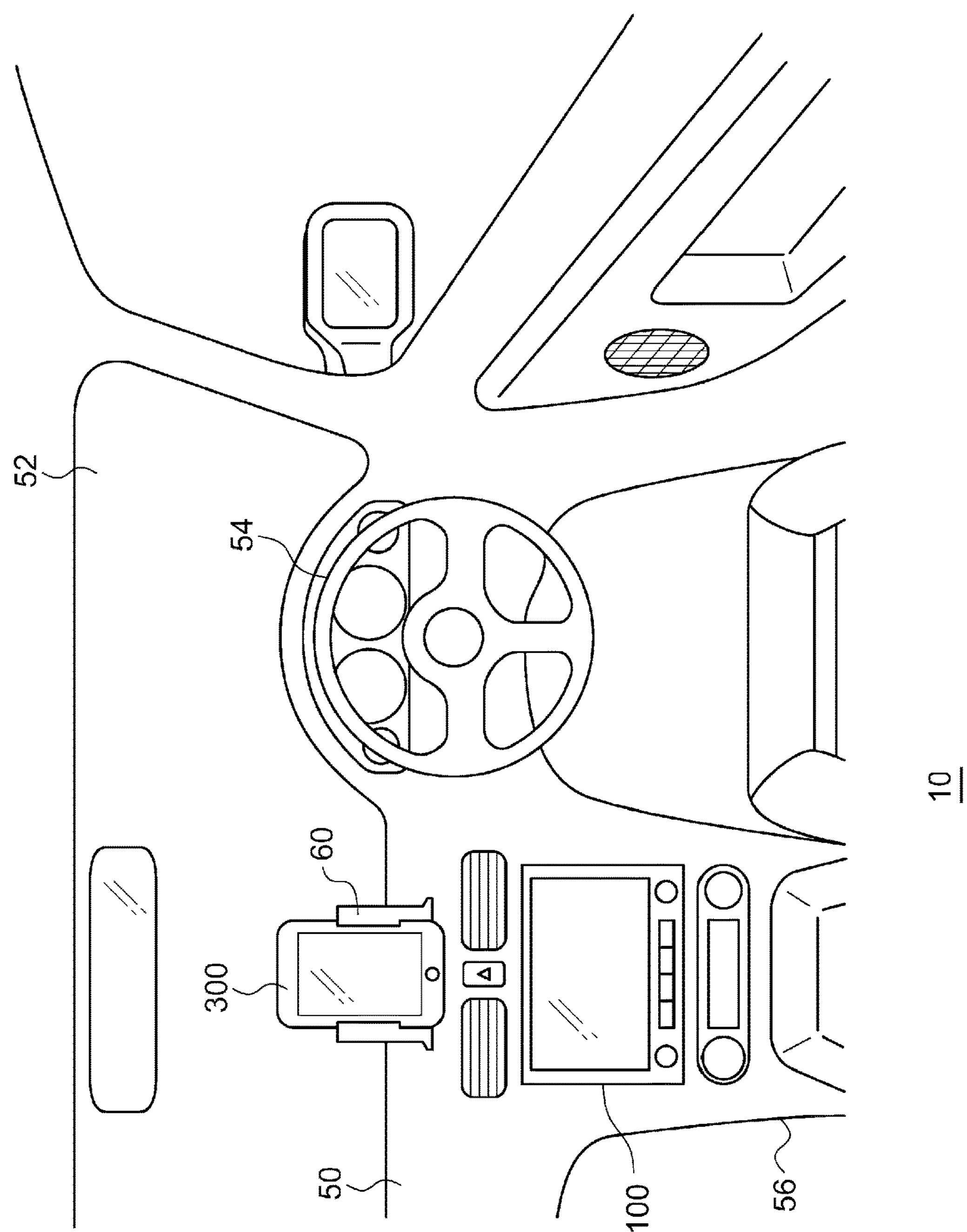
FIG. 1 is a diagram showing a structure of interior of a vehicle according to a first example.

FIG. 1 shows the structure of interior of the vehicle 10. A windshield 52 is placed in front of a dashboard 50 on the front side of the passenger compartment. A steering wheel 54 is located on the right side of the dashboard 50. Alternatively, the steering wheel 54 may be located on the left side of the dashboard 50. A center console 56 extending in the vertical direction is arranged in the central part of the dashboard 50, and an in-vehicle device 100 is fitted in the center console 56. A holding stand 60 is placed on the upper part of the center console 56. The holding stand 60 supports an information terminal 300. The information terminal 300 may be gripped by a user. The information terminal 300 and the in-vehicle device 100 can be connected wirelessly or by wire.

Figure 2:
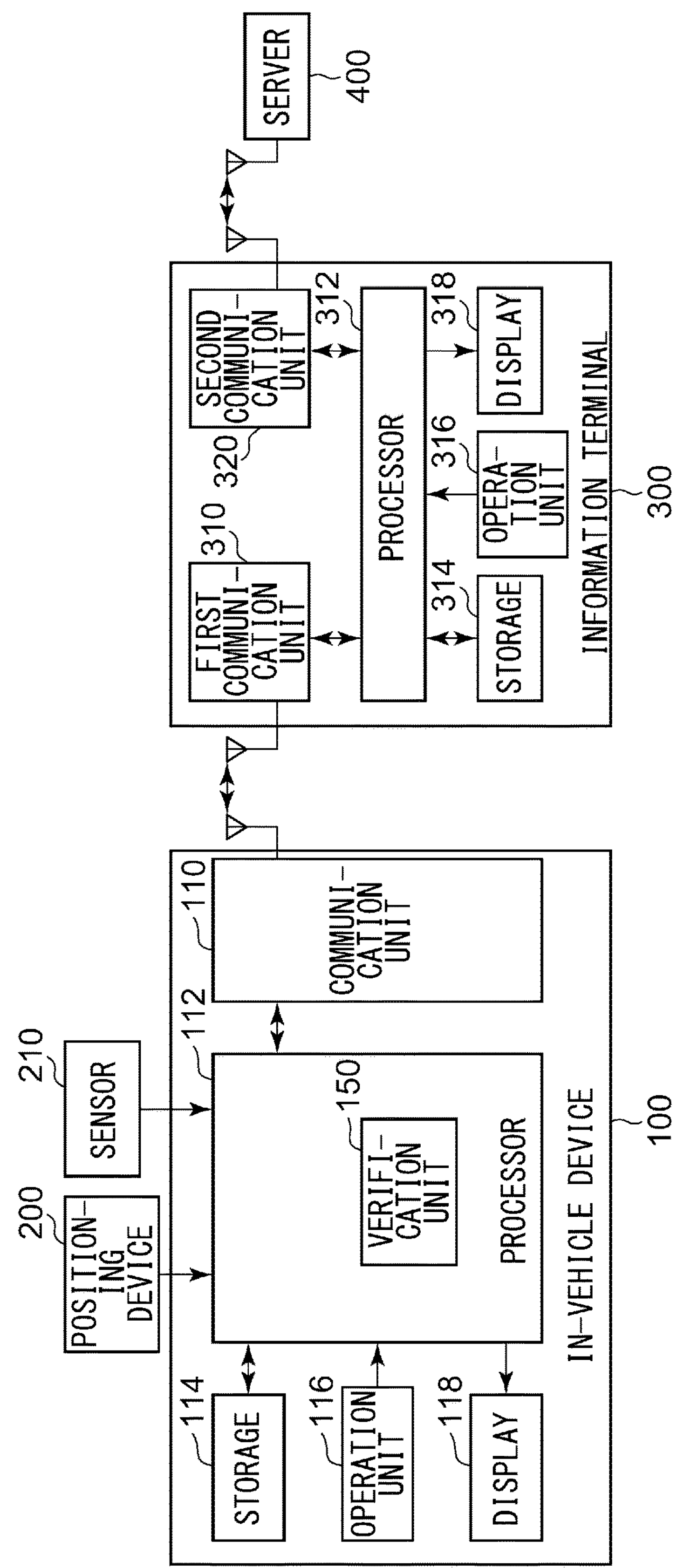
FIG. 2 is a diagram showing a configuration of an in-vehicle device mounted in the vehicle of FIG. 1 and a configuration of an information terminal and a server.

FIG. 2 shows a configuration of the in-vehicle device 100 mounted in the vehicle 10 and a configuration of the information terminal 300 and a server 400. The in-vehicle device 100 can be connected to a positioning device 200 and a sensor 210, and includes a communication unit 110, a processor 112, a storage 114, an operation unit 116, and a display 118. The processor 112 includes a verification unit 150. The information terminal 300 includes a first communication unit 310, a processor 312, a storage 314, an operation unit 316, a display 318, and a second communication unit 320.

As described above, the in-vehicle device 100 is a navigation device or the like, and is mounted in the vehicle 10. The positioning device 200 connected to the in-vehicle device 100 determines the position of the vehicle 10 based on a signal from a Global Navigation Satellite System (GNSS) satellite, and outputs determined position information to the in-vehicle device 100. The sensor 210 connected to the in-vehicle device 100 detects the speed of the vehicle 10 and outputs the result of the detection (hereinafter, "detection result") to the in-vehicle device 100. Since publicly known techniques may be used for these operations, description thereof will be omitted here.

The communication unit 110 executes wireless or wired communication. The communication unit 110 can connect to the information terminal 300. The communication unit 110 supports, for example, Bluetooth (registered trademark) and wireless local area network (LAN) as wireless communication functions. Application programs (hereinafter referred to as "applications") are stored in the storage 114. The applications include, for example, an application capable of executing a navigation function and an application capable of executing a function of replaying contents such as music or video, but these may be integrated. Information other than the applications may be stored in the storage 114. The operation unit 116 is an interface to be operated by the user, for example, buttons. The operation unit 116 may be integrated with the display 118 described later and configured as a touch panel. The operation unit 116 accepts an instruction from the user and outputs the accepted instruction to the processor 112. The display 118 is a monitor and displays videos, images, and messages output from the processor 112.

In this configuration, upon acceptance of an instruction from the operation unit 116, the processor 112 executes any of the applications stored in the storage 114 and displays the results on the display 118. When the application is capable of executing the navigation function, the processor 112 executes the application to display a screen for route guidance or the like on the display 118. The position information from the positioning device 200 and the detection results from the sensor 210 are used for the route guidance. When the application is capable of executing the video replaying function, the processor 112 executes the application to display the replayed video on the display 118. When the application is capable of executing the music replaying function, the processor 112 executes the application to output the replayed music from a speaker (not shown). Since publicly known techniques may be used for executing these applications, description thereof will be omitted here.

The information terminal 300 is a smartphone or the like as described above. The first communication unit 310 corresponds to a communication method in common with the communication unit 110 of the in-vehicle device 100, and can communicate with the communication unit 110. The second communication unit 320 executes wireless communication. The second communication unit 320 supports, for example, Long Term Evolution (LTE) and Metropolitan Area Network (MAN) as wireless communication functions.

The communication method supported by the second communication unit 320 has a longer communicable distance than the communication method supported by the first communication unit 310. The second communication unit 320 can communicate with the server 400.

Application programs (hereinafter referred to as "applications") are stored in the storage 314. The applications include, for example, a video replay application and an e-mail application. Information other than the applications may be stored in the storage 314.

The operation unit 316 is an interface to be operated by the user, for example, buttons. The operation unit 316 may be integrated with the display 318 described later and configured as a touch panel. The operation unit 316 accepts an instruction from the user and outputs the accepted instruction to the processor 312. Upon acceptance of an instruction from the operation unit 316, the processor 312 executes any of the applications stored in the storage 314 and displays the results on the display 318. The display 318 is a monitor and displays videos, images, and messages output from the processor 312. The server 400 connects to the information terminal 300 via a network (not shown), and executes processing in cooperation with the application executed on the information terminal 300.

Hereinafter, description will be provided as to processing in this configuration performed by the user connecting the information terminal 300 to the in-vehicle device 100 and causing the screen of the application executed by the information terminal 300 to be displayed on the display 118 of the in-vehicle device 100. Further, description will also be provided as to processing in which, when the user operates the operation unit 116 while watching the screen displayed on the display 118 of the in-vehicle device 100, the application in the information terminal 300 executes according to the operation. When the in-vehicle device 100 and the information terminal 300 are activated in the vehicle 10, the communication unit 110 of the in-vehicle device 100 connects to the first communication unit 310 of the information terminal 300. Since a publicly known technique may be used for the connection between the communication unit 110 and the first communication unit 310, description thereof will be omitted here.

When the verification unit 150 of the in-vehicle device 100 detects the connection between the communication unit 110 and the information terminal 300, the verification unit 150 verifies the security status of the information terminal 300. The security status is verified depending on (1) whether security software is installed on the information terminal 300, (2) whether the security software on the information terminal 300 is of the latest version, (3) whether a virus check has been executed on the information terminal 300, and (4) whether the user has approved that there is no problem with the security status.

(1) Whether Security Software is Installed on the Information Terminal 300

The verification unit 150 transmits a signal for inquiring whether security software is installed (hereinafter, referred to as "first inquiry signal") to the information terminal 300 via the communication unit 110. Upon receipt of the first inquiry signal, the first communication unit 310 of the information terminal 300 outputs the first inquiry signal to the processor 312. Upon acceptance of the first inquiry signal, the processor 312 generates a response signal indicating whether security software is installed (hereinafter referred to as "first response signal") based on the information stored in the storage 314. The processor 312 transmits the first response signal to the in-vehicle device 100 via the first communication unit 310.

Upon receipt of the first response signal, the communication unit 110 of the in-vehicle device 100 outputs the first response signal to the processor 112. When the first response signal indicates that security software is installed, the verification unit 150 determines that a first condition is satisfied. When the first response signal indicates that no security software is installed, the verification unit 150 causes the display 118 to display a screen for asking about whether to install security software. FIGS. 3A to 3E are diagrams showing screens displayed on the display 118. FIG. 3A shows the screen for asking about whether to install security software, where the message "Do you want to install security software?" and "Yes" and "No" buttons are displayed.

When the user selects the "No" button by operating the operation unit 116, the verification unit 150 determines that the first condition is not satisfied. On the other hand, when the user selects the "Yes" button by operating the operation unit 116, the verification unit 150 accepts an installation instruction from the operation unit 116. FIGS. 3B to 3E will be described later and reference returns to FIG. 2. The verification unit 150 transmits a signal for instructing for the installation of security software (hereinafter, referred to as "first instruction signal") to the information terminal 300 via the communication unit 110.

Upon receipt of the first instruction signal, the first communication unit 310 of the information terminal 300 outputs the first instruction signal to the processor 312. Upon acceptance of the first instruction signal, the processor 312 connects to the server 400 via the second communication unit 320, and downloads security software from the server 400 to the storage 314. Subsequently, the processor 312 installs the security software. When the installation is completed, the processor 312 generates a signal for reporting the completion of the installation (hereinafter, referred to as "first report signal"). The processor 312 transmits the first report signal to the in-vehicle device 100 via the first communication unit 310. Upon receipt of the first report signal, the communication unit 110 of the in-vehicle device 100 outputs the first report signal to the processor 112. Upon acceptance of the first report signal, the verification unit 150 determines that the first condition is satisfied.

(2) Whether the Security Software on the Information Terminal 300 is of the Latest Version When the first condition is satisfied, the verification unit 150 transmits a signal for inquiring whether the security software is of the latest version (hereinafter, referred to as "second inquiry signal") to the information terminal 300 via the communication unit 110. Upon receipt of the second inquiry signal, the first communication unit 310 of the information terminal 300 outputs the second inquiry signal to the processor 312. Upon acceptance of the second inquiry signal, the processor 312 transmits a signal for inquiring about the latest version of the security software to the server 400 via the second communication unit 320. The second communication unit 320 receives a signal indicating the latest version of the security software from the server 400. The processor 312 determines whether the installed security software is of the latest version based on the accepted latest version of the security software. The processor 312 generates a response signal indicating whether the security software is of the latest version (hereinafter, referred to as "second response signal"). The processor 312 transmits the second response signal to the in-vehicle device 100 via the first communication unit 310.

Upon receipt of the second response signal, the communication unit 110 of the in-vehicle device 100 outputs the second response signal to the processor 112. When the second response signal indicates that the security software is of the latest version, the verification unit 150 determines that a second condition is satisfied. When the second response signal indicates that the security software is not of the latest version, the verification unit 150 causes the display 118 to display a screen for asking about whether to upgrade the version of the security software. FIG. 3B shows the screen for asking about whether to upgrade the security software to the latest version, where the message "Do you want to upgrade the security software?" and "Yes" and "No" buttons are displayed.

When the user selects the "No" button by operating the operation unit 116, the verification unit 150 determines that the second condition is not satisfied. On the other hand, when the user selects the "Yes" button by operating the operation unit 116, the verification unit 150 accepts a version upgrade instruction from the operation unit 116. FIGS. 3C to 3E will be described later and reference returns to FIG. 2. The verification unit 150 transmits a signal for instructing for the version upgrade of the security software (hereinafter, referred to as "second instruction signal") to the information terminal 300 via the communication unit 110.

Upon receipt of the second instruction signal, the first communication unit 310 of the information terminal 300 outputs the second instruction signal to the processor 312. Upon acceptance of the second instruction signal, the processor 312 connects to the server 400 via the second communication unit 320, and downloads the security software of the latest version from the server 400 to the storage 314. Subsequently, the processor 312 executes the upgrade of the security software to the latest version. When the version upgrade is completed, the processor 312 generates a signal for reporting the completion of the version upgrade (hereinafter, referred to as "second report signal"). The processor 312 transmits the second report signal to the in-vehicle device 100 via the first communication unit 310. Upon receipt of the second report signal, the communication unit 110 of the in-vehicle device 100 outputs the second report signal to the processor 112. Upon acceptance of the second report signal, the verification unit 150 determines that the second condition is satisfied.

(3) Whether a Virus Check has been Executed on the Information Terminal 300

When the first condition and the second condition are satisfied, the verification unit 150 transmits a signal for inquiring whether a virus check has been executed (hereinafter, referred to as "third inquiry signal") to the information terminal 300 via the communication unit 110. Upon receipt of the third inquiry signal, the first communication unit 310 of the information terminal 300 outputs the third inquiry signal to the processor 312. Upon acceptance of the third inquiry signal, the processor 312 checks the execution date and time of a virus check stored in the storage 314. When the difference of the execution date and time from the current date and time is equal to or less than a predetermined value, the processor 312 determines that a virus check has been executed, and in other cases, the processor 312 determines that no virus check has been executed. The processor 312 generates a response signal indicating whether a virus check has been executed (hereinafter, referred to as "third response signal"). The processor 312 transmits the third response signal to the in-vehicle device 100 via the first communication unit 310.

Upon receipt of the third response signal, the communication unit 110 of the in-vehicle device 100 outputs the third response signal to the processor 112. When the third response signal indicates that a virus check has been executed, the verification unit 150 determines that a third condition is satisfied. When the third response signal indicates that no virus check has been executed, the verification unit 150 causes the display 118 to display a screen for asking about whether to execute a virus check. FIG. 3C shows a screen for asking about whether to execute a virus check, where the message "Do you want to execute a virus check?" and "Yes" and "No" button are displayed.

When the user selects the "No" button by operating the operation unit 116, the verification unit 150 determines that the third condition is not satisfied. On the other hand, when the user selects the "Yes" button by operating the operation unit 116, the verification unit 150 accepts an instruction for execution of a virus check from the operation unit 116. FIGS. 3D to 3E will be described later and reference returns to FIG. 2. The verification unit 150 transmits a signal for instructing for execution of a virus check (hereinafter, referred to as "third instruction signal") to the information terminal 300 via the communication unit 110.

Upon receipt of the third instruction signal, the first communication unit 310 of the information terminal 300 outputs the third instruction signal to the processor 312. Upon acceptance of the third instruction signal, the processor 312 executes a virus check by the security software. When the virus check is completed, the processor 312 generates a signal for reporting the completion of the virus check (hereinafter, referred to as "third report signal"). The processor 312 transmits the third report signal to the in-vehicle device 100 via the first communication unit 310. Upon receipt of the third report signal, the communication unit 110 of the in-vehicle device 100 outputs the third report signal to the processor 112. Upon acceptance of the third report signal, the verification unit 150 determines that the third condition is satisfied.

(4) Whether the User has Approved that there is No Problem with the Security Status When the first to third conditions are satisfied, the verification unit 150 causes the display 118 to display a screen for asking about whether there is no problem in the security status. FIG. 3D shows the screen for asking about whether there is no problem with the security status, where the message "Is there no problem with the security status?" and "Yes" and "No" buttons are displayed.

When the user selects the "No" button by operating the operation unit 116, the verification unit 150 determines that a fourth condition is not satisfied. On the other hand, when the user selects the "Yes" button by operating the operation unit 116, the verification unit 150 determines that the fourth condition is satisfied. FIG. 3E will be described later and reference returns to FIG. 2. That is, the verification unit 150 verifies the security status of the information terminal 300 by input from the user.

When the first to fourth conditions are satisfied, the verification unit 150 verifies that there is no problem with the security status of the information terminal 300, and determines to continue the connection between the in-vehicle device 100 and the information terminal 300. On the other hand, when at least one of the first to fourth conditions is not satisfied, the verification unit 150 causes the display 118 to display a screen for asking about whether to connect the information terminal 300 to the in-vehicle device 100. FIG. 3E shows a screen for asking about whether to connect the information terminal 300 to the in-vehicle device 100, where the message "Do you want to continue the connection?" and "Yes" and "No" buttons are displayed. When the user selects the "No" button by operating the operation unit 116, the verification unit 150 determines to disconnect the in-vehicle device 100 and the information terminal 300, and causes the communication unit 110 to disconnect. On the other hand, when the user selects the "Yes" button by operating the operation unit 116, the verification unit 150 determines to continue the connection between the in-vehicle device 100 and the information terminal 300. Reference will return to FIG. 2.

When the verification unit 150 determines to continue the connection between the in-vehicle device 100 and the information terminal 300, the processor 112 transmits a notification signal for notifying the continuance of the connection to the information terminal 300 via the communication unit 110. The continuation of the connection corresponds to cooperation between the in-vehicle device 100 and the information terminal 300. Upon receipt of the notification signal, the first communication unit 310 of the information terminal 300 outputs the notification signal to the processor 312. Upon acceptance of the notification signal, the processor 312 transmits an inquiry signal for inquiring about the size of an image displayable on the display 118, that is, the resolution of the display 118, to the in-vehicle device 100 via the first communication unit 310. Upon receipt of the inquiry signal, the communication unit 110 of the in-vehicle device 100 outputs the inquiry signal to the processor 112. Upon acceptance of the inquiry signal, the processor 112 transmits a response signal indicating the size of an image displayable on the display 118, that is, the resolution of the display 118, to the information terminal 300 via the communication unit 110. Upon receipt of the response signal, the first communication unit 310 of the information terminal 300 outputs the response signal to the processor 312. The processor 312 recognizes the size of an image displayable on the display 118, that is, the resolution of the display 118, based on the response signal.

The processor 312 of the information terminal 300 executes the application and transmits information on the screen of the execution results (hereinafter, referred to as "image signal") to the in-vehicle device 100 via the first communication unit 310. At that time, the screen of the execution results is generated according to the size of an image displayable on the display 118, that is, the resolution of the display 118. Upon receipt of the image signal from the information terminal 300, the communication unit 110 of the in-vehicle device 100 outputs the image signal to the processor 112. The processor 112 causes the display 118 to display an image based on the image signal. That is, when there is no problem in the security status of the information terminal 300 verified by the verification unit 150, the display 118 displays an image based on the image signal received by the communication unit 110 from the information terminal 300.

Upon acceptance of the user's operation on the image displayed on the display 118, the operation unit 116 outputs the details of the operation to the processor 112. The processor 112 transmits an operation signal indicating the details of the operation to the information terminal 300 via the communication unit 110. Upon receipt of the operation signal, the first communication unit 310 of the information terminal 300 outputs the operation signal to the processor 312. The processor 312 executes the application according to the details of the operation included in the operation signal, and transmits information on the screen of execution results (hereinafter referred to as "image signal") to the in-vehicle device 100 via the first communication unit 310. Upon receipt of the image signal from the information terminal 300, the communication unit 110 of the in-vehicle device 100 outputs the image signal to the processor 112. The processor 112 causes the display 118 to display an image based on the image signal.

This configuration can be realized by a central processing unit (CPU), memory, and other large scale integration (LSI) of any computer in terms of hardware, and can be realized by programs loaded in memory in terms of software. However, the functional blocks depicted here are realized by their cooperation. Therefore, it will be understood by those skilled in the art that these functional blocks can be realized in various forms only by hardware and by a combination of hardware and software.

Figure 4:
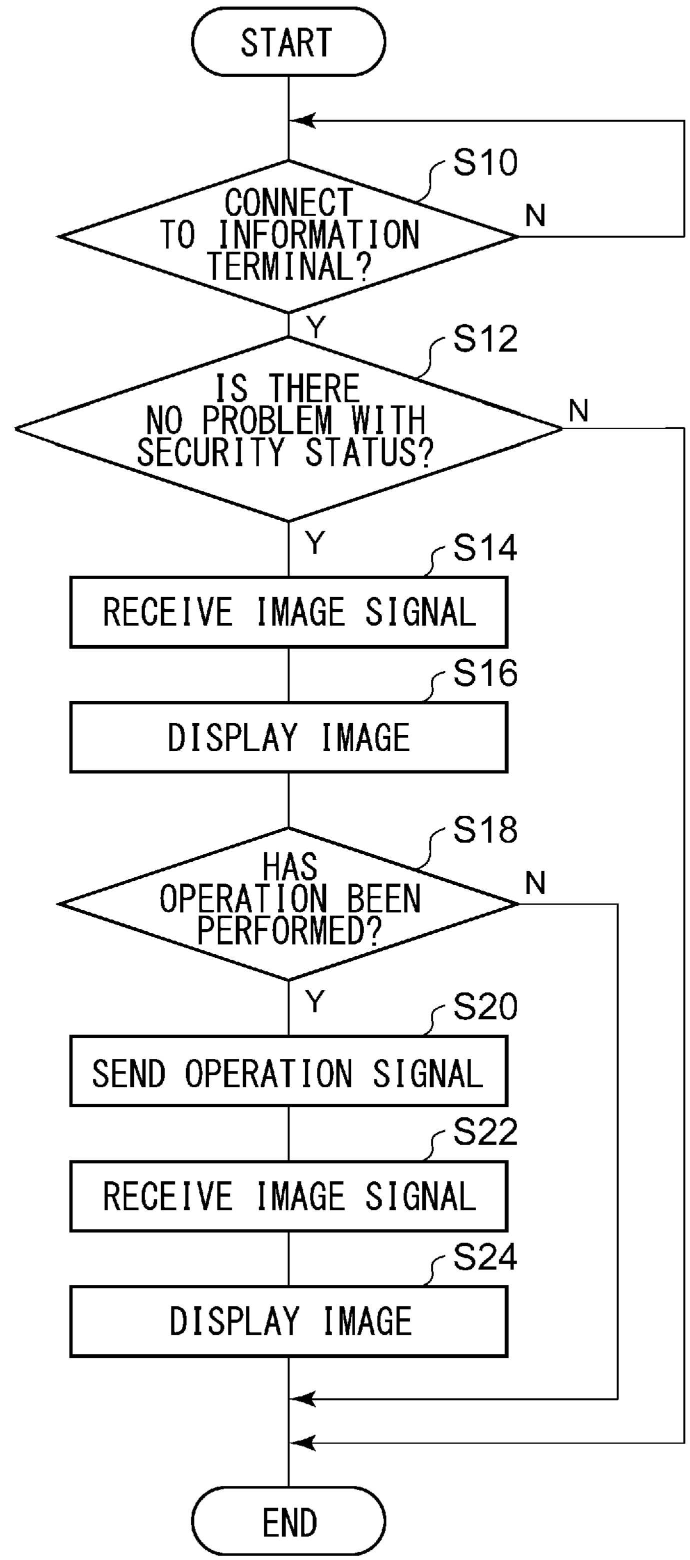
FIG. 4 is a flowchart showing a processing procedure performed by the in-vehicle device of FIG. 2.

The operations of the in-vehicle device 100 with the above configuration will be described. FIG. 4 is a flowchart showing a processing procedure performed by the in-vehicle device 100. When the communication unit 110 does not connect to the information terminal 300 (N in S10), the in-vehicle device stands by. When the communication unit 110 connects to the information terminal 300 (Y in S10) and the verification unit 150 verifies that there is no problem with the security status of the information terminal 300 (Y in S12), the communication unit 110 receives an image signal from the information terminal 300 (S14). The display 118 displays an image (S16). When the operation unit 116 accepts an operation (Y in S18), the communication unit 110 transmits an operation signal to the information terminal 300 (S20). The communication unit 110 receives an image signal (S22). The display 118 displays an image (S24). When the verification unit 150 does not verify that there is no problem with the security status of the information terminal 300 (N in S12), or when the operation unit 116 does not accept an operation (N in S18), the process is terminated.

Figure 5:
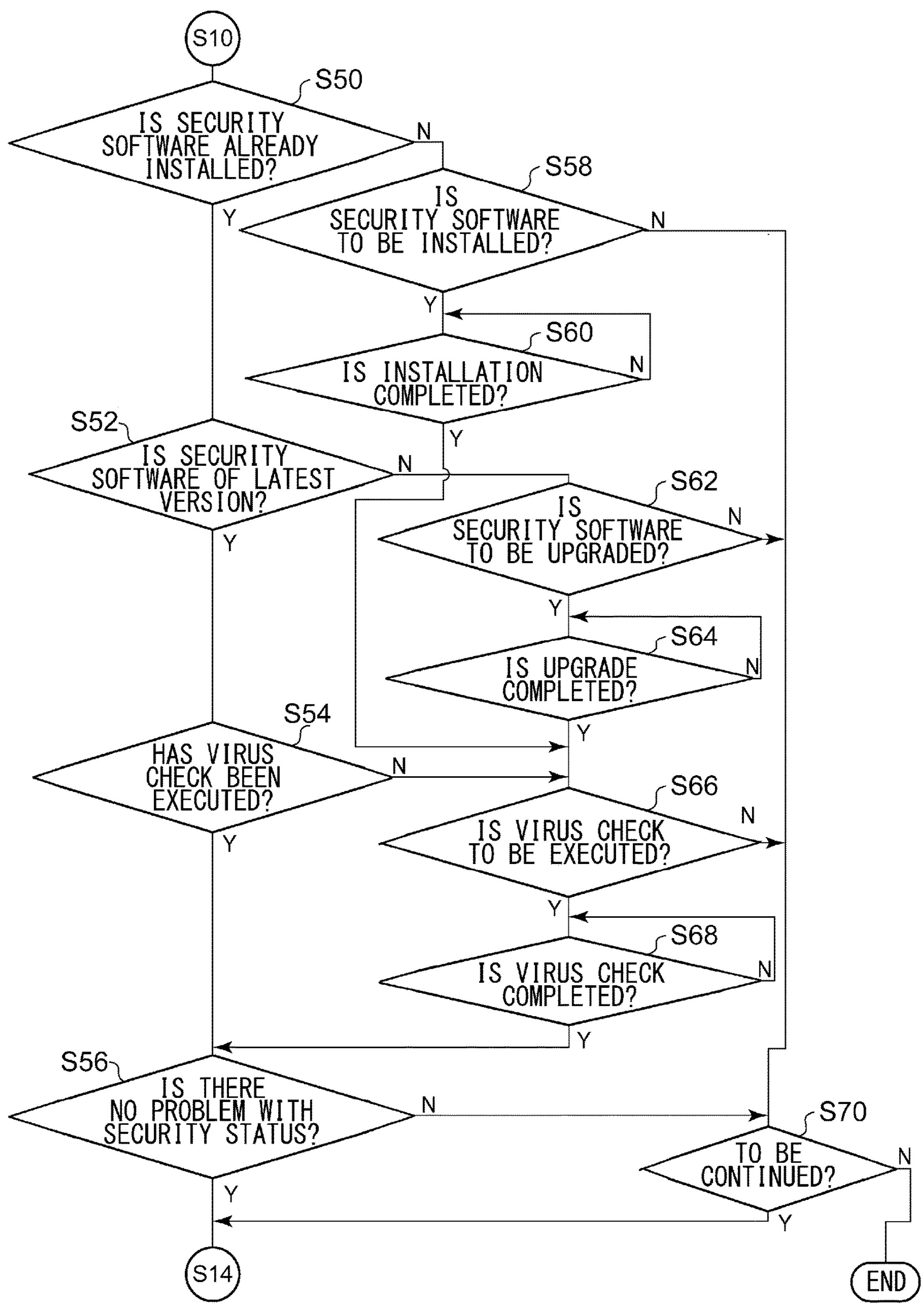
FIG. 5 is a flowchart showing a procedure for verifying a security status of the information terminal by the in-vehicle device of FIG. 2.

FIG. 5 is a flowchart showing a procedure for verifying the security status of the information terminal 300 by the in-vehicle device 100. This corresponds to step 12 in FIG. 4. When security software is installed (Y in S50), the security software is of the latest version (Y in S52), a virus check has been performed (Y in S54), and an input indicating no problem in security status has been accepted (Y in S56), the process proceeds to step 14 in FIG. 4. When no input indicating no problem with the security status has been accepted (N in S56), the process proceeds to step 70. When no security software is installed (N in S50), security software is installed (Y in S58). When the installation is not completed (N in S60), the process waits. When the installation is complete (Y in S60), the process proceeds to step 66.

When the security software is not of the latest version (N in S52), the version of the security software is upgraded (Y in S62). When the version upgrade is not completed (N in S64), the process waits. When the version upgrade is completed (Y in S64), the process proceeds to step 66. When a virus check has not been executed (N in S54), a virus check is executed (Y in S66). When the virus check is not completed (N in S68), the process waits. When the virus check is completed (Y in S68), the process proceeds to step 56. When no security software is installed (N in S58), the version of the security software has not been upgraded (N in S62), or the virus check has not been executed (N in S66) and when the connection is to be continued (Y in S70), the process proceeds to step 14 in FIG. 4. When the connection is not to be continued (N in S70), the process proceeds to the end in FIG. 4.

According to this example, when there is no problem with the security status of the information terminal, an image based on the image signal received from the information terminal is displayed, so that it is possible to secure safety in connecting the in-vehicle device and the information terminal. In contrast, when there is any problem with the security status of the information terminal, an image based on the image signal received from the information terminal is not displayed, so that it is possible to secure safety in connecting the in-vehicle device and the information terminal. Further, since the security status of the information terminal is verified by the input from the user, the user is allowed to recognize the security information.

Second Example

Next, a second example will be described. As in the first example, the second example relates to an in-vehicle system including an in-vehicle device mounted in a vehicle and an information terminal connected to the in-vehicle device. The second example relates to display of a connection permission in a case where the in-vehicle device and the information terminal are connected. An in-vehicle device 100, an information terminal 300, and a server 400 according to the second example are of the same types as those illustrated in FIG. 2. Here, the differences from the first example will be mainly described.

Figures 6A, 6B, 6C:
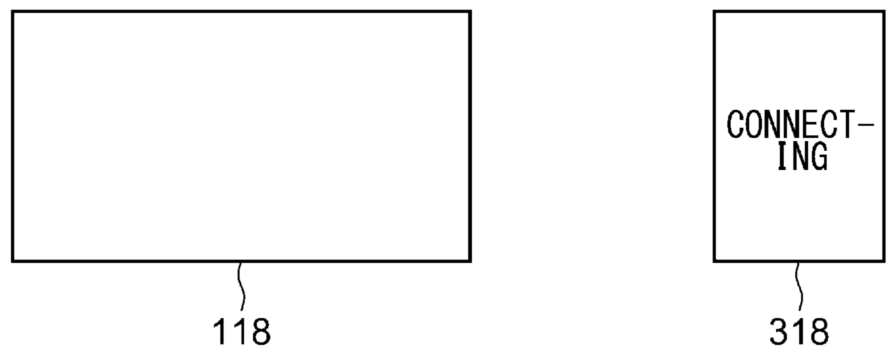
FIGS. 6A-6C are diagrams showing screens displayed on an in-vehicle device and an information terminal in a second example.

Here, a case where a communication unit 110 of the in-vehicle device 100 and a first communication unit 310 of the information terminal 300 in FIG. 2 are connected or a case where a verification unit 150 determines to continue the connection between the in-vehicle device 100 and the information terminal 300 will be described. This corresponds to a case before an image signal is transmitted from the information terminal 300 to the in-vehicle device 100. In such a situation, a connection notification is displayed. FIGS. 6A to 6C show screens displayed on the in-vehicle device 100 and the information terminal 300. Referring to FIG. 6A, a processor 112 of the in-vehicle device 100 displays the message "Connecting" on a display 118, and a processor 312 of the information terminal 300 displays the message "Connecting" on a display 318. Referring to FIG. 6B, the processor 112 of the in-vehicle device 100 displays the message "Connecting" on the display 118. On the other hand, no display is made on the display 318 of the information terminal 300. Referring to FIG. 6C, the processor 312 of the information terminal 300 displays the message "Connecting" on the display 318. On the other hand, no display is made on the display 118 of the in-vehicle device 100. That is, at least one of the display 118 and the display 318 displays a connection notification when the in-vehicle device 100 and the information terminal 300 are connected.

According to the present example, at least one of the in-vehicle device and the information terminal displays a connection notification when the communication unit and the information terminal are connected, so that the user is allowed to recognize the connection. Since the user is allowed to recognize the connection, it is possible to reduce the stress on the user when the in-vehicle device and the information terminal cooperate with each other.

Third Example

Next, a third example will be described. As in the examples described above, the third example relates to an in-vehicle system including an in-vehicle device mounted in a vehicle and an information terminal connected to the in-vehicle device. The third example relates to the operations of the information terminal while the vehicle is running. An in-vehicle device 100, an information terminal 300, and a server 400 according to the third example are of the same types as those illustrated in FIG. 2. Here, the differences from the examples described above will be mainly described.

Here, a case where a communication unit 110 of the in-vehicle device 100 and a first communication unit 310 of the information terminal 300 in FIG. 2 are connected or a case where a verification unit 150 determines to continue the connection between the in-vehicle device 100 and the information terminal 300 will be described. This corresponds to a case before an image signal is transmitted from the information terminal 300 to the in-vehicle device 100. In such a situation, a processor 312 of the information terminal 300 displays a notification on a display 318 for notifying restrictions on the operation of a vehicle 10 while running. FIGS. 7A to 7C are diagrams showing screens displayed on the display 318. As shown in FIG. 7A, the message "Smartphone operation will be restricted while driving" is displayed on the display 318. The processor 312 displays such a message on the display 318 regardless of whether the vehicle 10 is running. FIGS. 7B and 7C will be described later and reference returns to FIG. 2.

The following processing may be executed in the in-vehicle device 100 and the information terminal 300. Here, a case after an image signal is transmitted from the information terminal 300 to the in-vehicle device 100 will be described. When a sensor 210 detects the running speed of the vehicle 10, the processor 112 determines that the vehicle 10 is running if the detection result from the sensor 210 shows a running speed equal to or higher than a predetermined value. Subsequently, the processor 112 transmits a notification signal for notifying that the vehicle 10 is running to the information terminal 300 via the communication unit 110. Upon receipt of the notification signal, the first communication unit 310 of the information terminal 300 outputs the notification signal to the processor 312. When the user operates an operation unit 316 in such a state, the processor 312 displays a screen for calling the user's attention on the display 318. The message "Please don't use your smartphone except when the vehicle is stopped" as shown in FIG. 7B is displayed on the display 318. FIG. 7C will be described later and reference returns to FIG. 2.

The following processing may be executed in the in-vehicle device 100 and the information terminal 300. Here, a case where a communication unit 110 of the in-vehicle device 100 and a first communication unit 310 of the information terminal 300 in FIG. 2 are connected or a case where a verification unit 150 determines to continue the connection between the in-vehicle device 100 and the information terminal 300 will be described. This corresponds to a case before an image signal is transmitted from the information terminal 300 to the in-vehicle device 100. When a sensor 210 detects the running speed of the vehicle 10, the processor 112 determines that the vehicle 10 is running if the detection result from the sensor 210 shows a running speed equal to or higher than a predetermined value. Subsequently, the processor 112 transmits a notification signal for notifying that the vehicle 10 is running to the information terminal 300 via the communication unit 110. Upon receipt of the notification signal, the first communication unit 310 of the information terminal 300 outputs the notification signal to the processor 312. When the user operates an operation unit 316 in such a state, the processor 312 displays a screen for calling the user's attention on the display 318. The message "It is dangerous to operate a smartphone while driving" as shown in FIG. 7C is displayed on the display 318. That is, when the in-vehicle device 100 and the information terminal 300 are connected while the vehicle 10 is running, the screen for calling the user's attention as shown in FIG. 7C is displayed on the information terminal 300. Reference will return to FIG. 2.

The following processing may be executed in the in-vehicle device 100 and the information terminal 300. Here, a case after an image signal is transmitted from the information terminal 300 to the in-vehicle device 100 will be described. When a sensor 210 detects the running speed of the vehicle 10, the processor 112 determines that the vehicle 10 is running if the detection result from the sensor 210 shows a running speed equal to or higher than a predetermined value. Subsequently, the processor 112 transmits a notification signal for notifying that the vehicle 10 is running to the information terminal 300 via the communication unit 110. Upon receipt of the notification signal, the first communication unit 310 of the information terminal 300 outputs the notification signal to the processor 312. In such a state, the processor 312 disables operations with the operation unit 316. That is, even if the user performs the operation unit 316, the processor 312 does not accept the operation. This corresponds to prohibiting the operation of the information terminal 300 while driving. On the other hand, operations with the operation unit 116 may be enabled.

Figure 8:
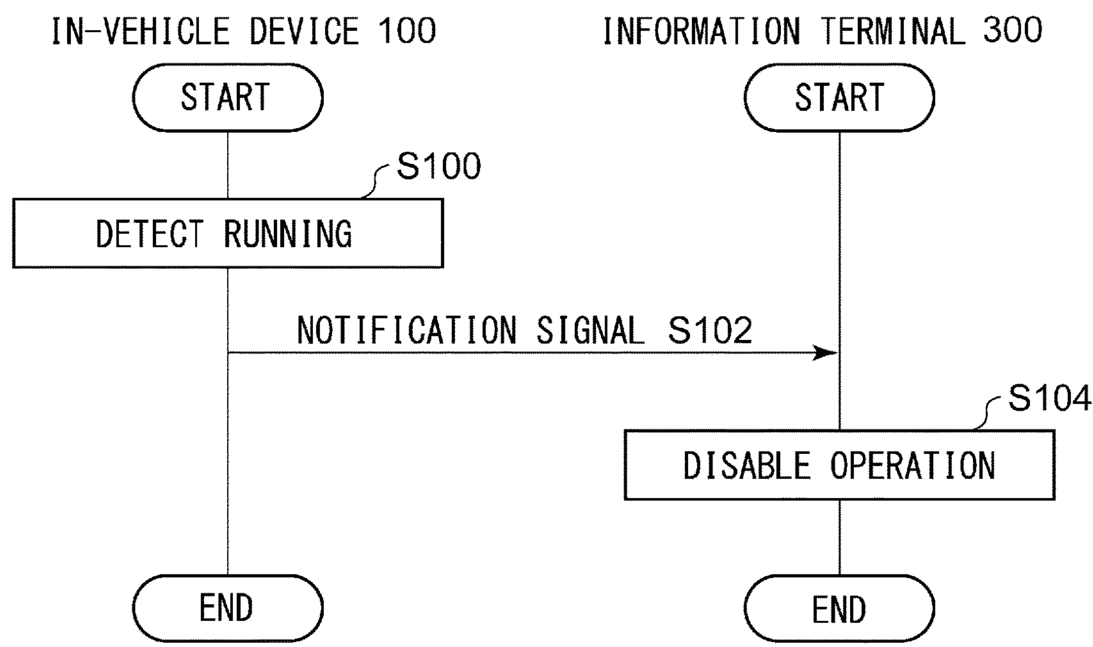
FIG. 8 is a sequence diagram showing a processing procedure performed by an in-vehicle device and an information terminal in the third example.

The operations of the in-vehicle device 100 and the information terminal 300 with the above configuration will be described. FIG. 8 is a sequence diagram showing a processing procedure performed by the in-vehicle device 100 and the information terminal 300. The in-vehicle device 100 detects the running of the vehicle 10 (S100). The in-vehicle device 100 transmits a notification signal to the information terminal 300 (S102). The operation of the information terminal 300 is disabled (S104).

According to the present example, since the notification for informing the restriction on the operation of the information terminal while the vehicle is running is displayed, it is possible to allow the user to recognize the restriction on the operation of the information terminal. Since it is notified to the user that the operation of the information terminal is restricted while driving, it is possible to prevent a traffic accident that might occur due to the operation of the information terminal while driving. Since the user is requested to operate the information terminal only when the vehicle is stopped, it is possible to prevent a traffic accident that might occur due to the operation of the information terminal while driving. Since it is notified to the user that operation of the information terminal is restricted while driving, it is possible to prevent a traffic accident that might occur due to the operation of the information terminal while driving. Since the operation of the information terminal is disabled while driving, it is possible to prevent a traffic accident due to the operation of the information terminal while driving.

Fourth Example

Next, a fourth example will be described. As in the examples described above, the fourth example relates to an in-vehicle system including an in-vehicle device mounted in a vehicle and an information terminal connected to the in-vehicle device. The fourth example relates to the operations of the in-vehicle device while the vehicle is running. An in-vehicle device 100, an information terminal 300, and a server 400 according to the fourth example are of the same types as those illustrated in FIG. 2. Here, the differences from the examples described above will be mainly described.

Here, a case after an image signal is transmitted from the information terminal 300 to the in-vehicle device 100 will be described. If the processor 312 of the information terminal 300 illustrated in FIG. 2 is executing a message application such as an e-mail application, the second communication unit 320, upon receipt of a message from the server 400, outputs the message to the processor 312. Upon acceptance of the message, the processor 312 transmits the message to the in-vehicle device 100 via the first communication unit 310.

Figure 9A:
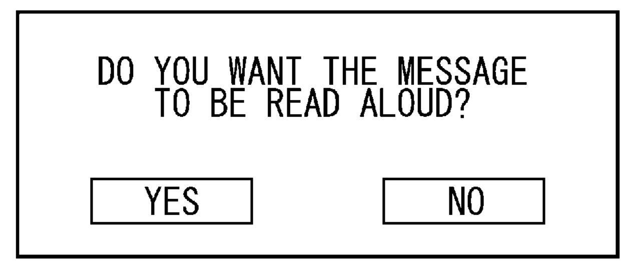
FIGS. 9A-9B are diagrams showing screens displayed on a display in a fourth example.
Figure 9B:
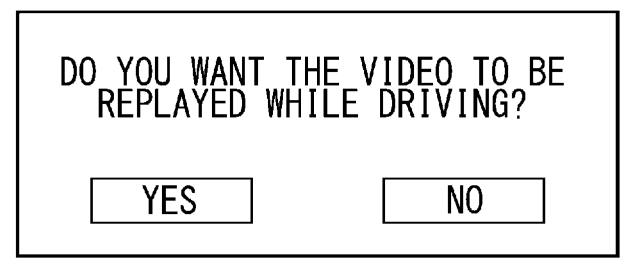

Upon receipt of the message, the communication unit 110 of the in-vehicle device 100 outputs the message to the processor 112. Upon acceptance of the message, the processor 112 causes the display 118 to display a screen for asking about whether to read aloud the message. FIGS. 9A and 9B are diagrams showing screens displayed on the display 118. FIG. 9A shows the screen for asking about whether to read aloud the message, where the message "Do you want the message to be read aloud?" and "Yes" and "No" buttons are displayed. When the user selects the "No" button by operating the operation unit 116, the processor 112 displays the message on the display 118. On the other hand, when the user selects the "Yes" button by operating the operation unit 116, the processor 112 outputs the message by a voice through voice conversion from a speaker (not shown). Reference will return to FIG. 2.

The processor 112 is preset to provide a notification with a preamble "You have got a message from Mr./Ms. XX (notify the name of the sender)" or "A message has been received (non-notify the name of the sender)". The processor 112 makes a notification according to the presetting. Alternatively, the processor 112 may be set not to provide a notification.

The following processing may be executed in the in-vehicle device 100 and the information terminal 300. Here, a case where a communication unit 110 of the in-vehicle device 100 and a first communication unit 310 of the information terminal 300 in FIG. 2 are connected or a case where a verification unit 150 determines to continue the connection between the in-vehicle device 100 and the information terminal 300 will be described. This corresponds to a case before an image signal is transmitted from the information terminal 300 to the in-vehicle device 100. The processor 112 causes the display 118 to display a screen for asking about whether to replay the video during driving. FIG. 9B shows the screen for asking about whether to replay the video while driving, where the message "Do you want the video to be replayed while driving?" and "Yes" and "No" buttons are displayed. When the user selects the "No" button by operating the operation unit 116, the processor 112 does not cause the display 118 to display the replayed video. On the other hand, when the user selects the "Yes" button by operating the operation unit 116, the processor 112 causes the display 118 to display the replayed video.

According to the present example, it is possible to select whether to read aloud the message, so that the privacy of the user can be protected. In addition, since it is possible to select whether to replay the video while driving, it is possible to improve the comfort while moving.

Fifth Example

Next, a fifth example will be described. As in the examples described above, the fifth example relates to an in-vehicle system including an in-vehicle device mounted in a vehicle and an information terminal connected to the in-vehicle device. In the fifth embodiment, an application displayable on the in-vehicle device (hereinafter referred to as "first application") and an application non-displayable on the in-vehicle device (hereinafter referred to as "second application") can be executed on the information terminal. The in-vehicle device displays a screen for the results of executing the first application, and does not display a screen for the results of executing the second application. An in-vehicle device 100, an information terminal 300, and a server 400 according to the fifth example are of the same types as those illustrated in FIG. 2. Here, the differences from the examples described above will be mainly described.

A plurality of types of applications including the first application and the second application is stored in the storage 314 of the information terminal 300 of FIG. 2. In addition, the storage 314 also holds setting information for each application such as the first application being displayable on the in-vehicle device 100 and the second application being non-displayable on the in-vehicle device 100.

In the case of executing the first application stored in the storage 314, the processor 312 transmits an image signal as a result of processing the first application to the in-vehicle device 100 via the first communication unit 310 according to the setting information. Subsequent processes performed by the in-vehicle device 100 and the information terminal 300 are the same as those in the examples described above, and the display 118 displays an image based on the image signal as a result of processing the first application by the information terminal 300. The operation unit 116 accepts an operation on the image displayed by the display 118. The communication unit 110 transmits an operation signal responsive to the operation accepted by the operation unit 116 to the information terminal 300, and then receives an image signal as a result of processing the first application by the information terminal 300 in accordance with the operation signal from the information terminal 300.

In the case of executing the second application stored in the storage 314, the processor 312 causes the display 318 to display an image as a result of processing the second application according to the setting information. However, the processor 312 does not transmit an image signal as a result of processing the second application to the in-vehicle device 100 via the first communication unit 310. Consequently, the display 118 of the communication unit 110 does not display an image based on the image signal as a result of processing the second application by the information terminal 300.

Figure 10:
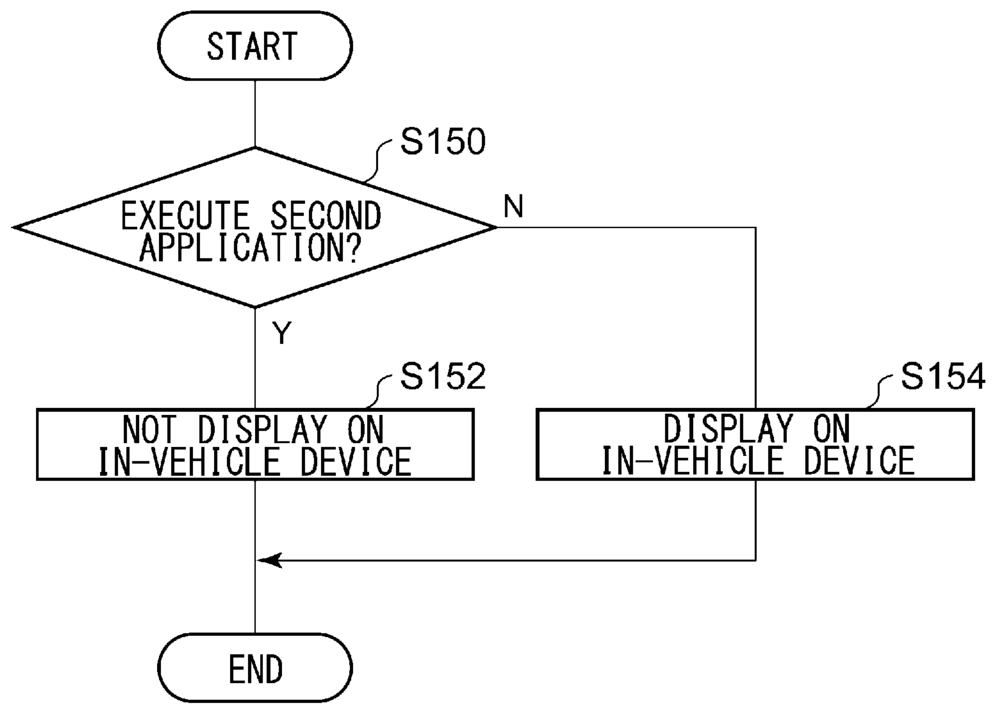
FIG. 10 is a flowchart showing a processing procedure performed by an information terminal in a fifth example.

The operations of the information terminal 300 with the above configuration will be described. FIG. 10 is a flowchart showing a processing procedure performed by the information terminal 300. When the processor 312 executes the second application (Y in S150), the first communication unit 310 does not cause the in-vehicle device 100 to display the image of the processing result (S152). When the processor 312 does not execute the second application (N in S150), that is, when the processor 312 executes the first application, the first communication unit 310 causes the in-vehicle device 100 to display the image of the processing result (S154).

According to the present example, an image based on the image signal as a result of processing the first application is displayed on the in-vehicle device, and an image based on the image signal as a result of processing the second application is not displayed on the in-vehicle device so that the utilization forms of the applications can be increased. In addition, since the application to be displayed on the in-vehicle device is limited, it is possible to reduce the operation stress on the user.

Sixth Example

Next, a sixth example will be described. As in the examples described above, the sixth example relates to an in-vehicle system including an in-vehicle device mounted in a vehicle and an information terminal connected to the in-vehicle device. Here, an application installed in the in-vehicle device is referred to as "internal application", and an application installed in the information terminal is referred to as "external application". These external application and internal application are version-upgraded when new functions are added thereto. If the version of the internal application is upgraded but the version of the external application is not upgraded, new functions may not be usable or the two applications may not be connectable. Accordingly, the reliability of the applications will not be ensured. In addition, when a security hole is found in the external application and the internal application, a patch for fixing the security hole is distributed as a version upgrade. If the version of the external application is not upgraded in such a situation, the security hole will remain and the reliability of the applications will not be ensured.

It is necessary to upgrade the version in order to ensure reliability, but it is preferable that the operability at that time is easy. Therefore, it is required to ensure both reliability and easy operability. In order to ensure both reliability and easy operability, upon receipt of a request for executing the internal application from the information terminal, the in-vehicle device according to the present example checks with the information terminal about the version of the external application executed in the information terminal. If the checked version is earlier than a threshold value, the in-vehicle device issues a warning. For example, a message such as "Cannot connect" is displayed on the monitor of the in-vehicle device. As a result, the user of the information terminal can easily upgrade the version of the external application.

The verification unit 150 of the in-vehicle device 100 outputs a signal for requesting transmission of information indicating the version of the external application executed in the information terminal 300 (hereinafter, referred to as "version request") to the communication unit 110. Here, the information indicating the version of the external application is also referred to as "version information". Upon acceptance of the version request from the verification unit 154, the communication unit 110 transmits the version request to the information terminal 300.

The first communication unit 310 of the information terminal 300 receives the version request from the in-vehicle device 100. The first communication unit 310 outputs the received version request to the processor 312. Upon acceptance of the version request, the external application executed in the processor 312 outputs the version information of the external application to the first communication unit 310. The first communication unit 310 transmits the accepted version information to the in-vehicle device 100.

The communication unit 110 of the in-vehicle device 100 receives the version information from the information terminal 300. The communication unit 110 outputs the received version information to the verification unit 150. The storage 114 stores the threshold value for the version. This threshold value is preset as the version of the external application that works without problems in cooperation with the internal application. For example, the processor 112 connects to the server 400 via the communication unit 110 and the information terminal 300, acquires the threshold value from the server 400, and stores the same in the storage 114. In addition to the communication unit 110, the processor 112 may include a communication unit connectable to the server 400, connect to the server 400 via that communication unit, acquire the threshold value from the server 400, and store the same in the storage 114.

Upon acceptance of the version information from the communication unit 110, the verification unit 150 acquires the threshold value stored in the storage 114. The verification unit 150 compares the version indicated by the version information with the threshold value. When the version is a version of the threshold value or later, the verification unit 150 determines the execution of the internal application and instructs the processor 112 to execute the internal application. On the other hand, when the version is a version earlier than the threshold value, the verification unit 150 causes the display 118 to display a warning.

When instructed by the verification unit 150 to execute the internal application, the processor 112 executes the internal application. The execution of the internal application is as described above. Here, the internal application cooperates with the external application on the information terminal 300 via the communication unit 110. For example, an instruction input from the operation unit 316 to the external application is then input to the processor 112 via the first communication unit 310 and the communication unit 110, so that the internal application executes the process according to the instruction. In addition, the results of processing by the internal application are input to the processor 312 via the communication unit 110 and the first communication unit 310, so that the external application displays the results on the display 318.

When instructed by the verification unit 150 to display a warning, the display 118 displays the warning. For example, the display 118 displays the message "Cannot connect with this software version" and the message "Do you want to upgrade to the latest software and connect?". The display 118 also displays "Yes" and "No" buttons. This is equivalent to displaying a warning to prompt the version upgrade of the external application. The user operates the operation unit 116 to select the "No" button when the user does not intend to perform a version upgrade, and operates the operation unit 116 to select the "Yes" button when the user intends to perform a version upgrade. The verification unit 150 accepts the selection result from the operation unit 116. When the selection result is "No", the verification unit 150 ends the process. When the selection result is "Yes", the verification unit 150 outputs a signal for instructing the information terminal 300 to perform a version upgrade (hereinafter referred to as "version upgrade instruction") to the communication unit 110. The communication unit 110 transmits the version upgrade instruction to the information terminal 300.

The first communication unit 310 of the information terminal 300 receives the version upgrade instruction from the in-vehicle device 100. The first communication unit 310 outputs the received version upgrade instruction to the processor 312. Upon acceptance of the version upgrade instruction, the external application executed in the processor 312 outputs a signal for requesting a version upgrade (hereinafter referred to as "version upgrade request") to the second communication unit 320. The second communication unit 320 transmits the version upgrade request to the server 400. Upon receipt of the version upgrade request from the information terminal 300, the server 400 transmits an update program for the new version to the information terminal 300.

The second communication unit 320 of the information terminal 300 receives the update program from the server 400. The second communication unit 320 outputs the update program to the processor 312. The processor 312 updates the external application by the update program. This process corresponds to the version upgrade of the external application. The upgraded external application outputs the version information of the external application to the first communication unit 310. The first communication unit 310 transmits the accepted version information to the in-vehicle device 100.

Upon acceptance of the version information from the communication unit 110, the verification unit 150 acquires the threshold value stored in the storage 114. The verification unit 150 compares the version indicated by the version information with the threshold value. Since the version is a version of the threshold value or later, the verification unit 150 determines the execution of the internal application and instructs the processor 112 to execute the internal application.

Figure 11:
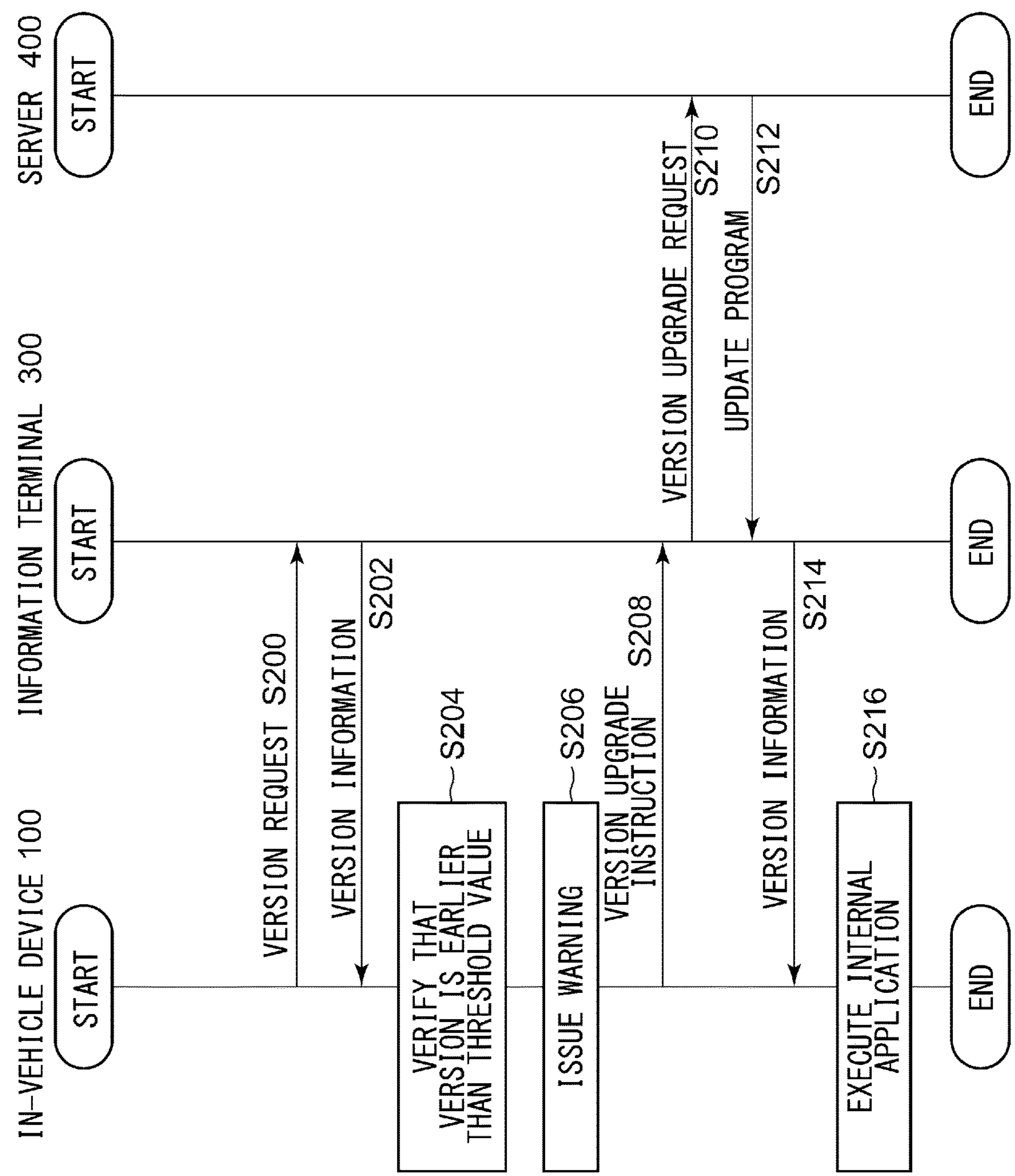
FIG. 11 is a sequence diagram showing a processing procedure performed by an in-vehicle device, an information terminal, and a server in a sixth example.

The operations of the in-vehicle device 100, the information terminal 300, and the server 400 with the above configuration will be described. FIG. 11 is a sequence diagram showing a processing procedure performed by the in-vehicle device 100, the information terminal 300, and the server 400. The in-vehicle device 100 transmits a version request to the information terminal 300 (S200). The information terminal 300 transmits the version information to the in-vehicle device 100 (S202). The in-vehicle device 100 verifies that the version is earlier than the threshold value (S204). The in-vehicle device 100 displays a warning (S206). The in-vehicle device 100 transmits a version upgrade instruction to the information terminal 300 (S208), and the information terminal 300 transmits a version upgrade request to the server 400 (S210). The server 400 transmits the update program to the information terminal 300 (S212), and the information terminal 300 executes the version upgrade and then transmits the version information to the in-vehicle device 100 (S214). The in-vehicle device 100 executes the internal application (S216).

According to the examples of the present disclosure, if the version of the external application is earlier than the threshold value, a warning is issued, so that the use of an older version of the application can be notified. Since the use of an older version of the application is notified, reliability can be ensured. Since the use of an older version of the application is automatically notified, easy reliability can be provided. If the version of the external application is earlier than the threshold value, a warning is notified, so when connecting two applications, reliability and easy operability can be achieved at the same time. Since a warning for prompting the version upgrade of the external application is issued, the version upgrade can be facilitated. Since the content of the warning is changed according to the difference between the version and the threshold value, it is possible to inform the degree of oldness of the version. Since the degree of oldness of the version is notified, it is possible to promote the version upgrade.

The outline of one aspect of the present disclosure is as follows. An in-vehicle device in an aspect of the present disclosure includes: a communication interface to which an information terminal is capable of connecting; a verification interface that, when a connection between the communication interface and the information terminal is detected, verifies a security status of the information terminal; a display that, when there is no problem in the security status of the information terminal verified by the verification interface, displays an image based on an image signal received by the communication interface from the information terminal; and an operation interface that accepts an operation on the image displayed by the display. The communication interface transmits an operation signal responsive to the operation accepted by the operation interface to the information terminal, and then receives an image signal as a result of processing by the information terminal in accordance with the operation signal from the information terminal.

According to this aspect, when there is no problem with the security status of the information terminal, an image based on the image signal received from the information terminal is displayed, so that it is possible to secure safety in connecting the in-vehicle device and the information terminal.

The verification interface may confirm the security status of the information terminal by input from the user. In this case, since the security status of the information terminal is verified by the input from the user, the user is allowed to recognize the security information.

Another aspect of the present disclosure is an in-vehicle system. This in-vehicle system includes an information terminal and an in-vehicle device. The in-vehicle device includes: a communication interface connectable to the information terminal; a display that, when the information terminal connects to the communication interface, displays an image based on an image signal received by the communication interface from the information terminal; and an operation interface that accepts an operation on the image displayed by the display. The communication interface transmits an operation signal responsive to the operation accepted by the operation interface to the information terminal, and then receives an image signal as a result of processing by the information terminal in accordance with the operation signal from the information terminal. When the communication interface and the information terminal are connected, at least one of the display and the information terminal displays a connection notification.

According to this aspect, at least one of the in-vehicle device and the information terminal displays a connection notification when the communication interface and the information terminal are connected, so that the user is allowed to recognize the connection.

Yet another aspect of the disclosure is also an in-vehicle system. This in-vehicle system includes an information terminal and an in-vehicle device. The in-vehicle device includes: a communication interface connectable to the information terminal; a display that, when the information terminal connects to the communication interface, displays an image based on an image signal received by the communication interface from the information terminal; and an operation interface that accepts an operation on the image displayed by the display. The communication interface transmits an operation signal responsive to the operation accepted by the operation interface to the information terminal, and then receives an image signal as a result of processing by the information terminal in accordance with the operation signal from the information terminal. The information terminal displays a notification for informing a restriction on an operation during running of a vehicle.

According to this aspect, since the notification for informing the restriction on the operation of the information terminal while the vehicle is running is displayed, it is possible to allow the user to recognize the restriction on the operation of the information terminal.

Yet another aspect of the disclosure is also an in-vehicle system. This in-vehicle system includes an information terminal capable of executing a first application and a second application that are different from each other, and an in-vehicle device. The in-vehicle device includes: a communication interface connectable to the information terminal; a display that, when the information terminal connects to the communication interface, displays an image based on an image signal received by the communication interface from the information terminal and resulting from processing of the first application by the information terminal; and an operation interface that accepts an operation on the image displayed by the display. The communication interface transmits an operation signal responsive to the operation accepted by the operation interface to the information terminal, and then receives an image signal resulting from processing of the first application by the information terminal in accordance with the operation signal from the information terminal. The display does not display an image based on an image signal resulting from processing of the second application by the information terminal.

According to this aspect, an image based on the image signal as a result of processing the first application is displayed on the in-vehicle device, and an image based on the image signal as a result of processing the second application is not displayed on the in-vehicle device so that the utilization forms of the applications can be increased.

The present disclosure has been described above based on the examples. The above-described examples have been described merely for exemplary purposes. Rather, it can be readily conceived by those skilled in the art that various modification examples may be made by making various combinations of the above-described components or processes, which are also encompassed in the technical scope of the present disclosure.

The verification unit 150 according to the first example uses the first to fourth conditions as the determination criteria. However, the present disclosure is not limited to this, and for example, the verification unit 150 may use one or more of the first to fourth conditions as the determination criteria. According to this modification example, the process can be simplified.

Each of the information terminals 300 according to the first to sixth embodiments may not display the R-rated contents on the display 118 and the display 318, for example. In this case, the information terminal 300 selects the relevant contents based on the previously registered keywords or R-rating check. The same applies to the in-vehicle device 100. According to this modification example, passengers (especially minors) can be protected from harmful contents.

Any combination of the first to sixth examples is also effective. According to this modification example, the effect of any combination can be obtained.

While various embodiments have been described herein above, it is to be appreciated that various changes in form and detail may be made without departing from the spirit and scope of the invention(s) presently or hereafter claimed.

CROSS-REFERENCE TO RELATED APPLICATION

This application is based upon and claims the benefit of priority from the prior Japanese Patent Application No. 2020-039930, filed on Mar. 9, 2020, the entire contents of which are incorporated herein by reference.

What is claimed is:

1. An in-vehicle device comprising:

a communication interface connectable to an information terminal;

a verification interface that verifies security status of the information terminal when detecting connection between the communication interface and the information terminal;

a display that displays an image based on an image signal received by the communication interface from the information terminal when there is no problem in the security status of the information terminal verified by the verification interface; and an operation interface that receives an operation on the image displayed by the display, wherein the communication interface transmits an operation signal responsive to the operation accepted by the operation interface to the information terminal, and then receives an image signal as a result of processing by the information terminal in accordance with the operation signal from the information terminal.

2. The in-vehicle device according to claim 1, wherein the verification interface verifies the security status of the information terminal by input from a user.

3. The in-vehicle device according to claim 1, wherein the verification interface verifies the security status depending on whether security software is installed on the information terminal, whether the security software on the information terminal is of latest version, whether a virus check has been executed on the information terminal, and the user has approved that there is no problem with the security status.

4. The in-vehicle device according to claim 1, wherein the in-vehicle device is a navigation device.

5. The in-vehicle device according to claim 1, wherein the information terminal is a smartphone.

6. An in-vehicle system comprising:

an information terminal; and an in-vehicle device, wherein the in-vehicle device includes:

a communication interface connectable to the information terminal;

a display that, when the information terminal connects to the communication interface, displays an image based on an image signal received by the communication interface from the information terminal; and an operation interface that accepts an operation on the image displayed by the display, the communication interface transmits an operation signal responsive to the operation accepted by the operation interface to the information terminal, and then receives an image signal as a result of processing by the information terminal in accordance with the operation signal from the information terminal, and when the communication interface and the information terminal are connected, at least one of the display and the information terminal displays a connection notification.

7. The in-vehicle system according to claim 6, wherein the in-vehicle device is a navigation device.

8. The in-vehicle system according to claim 6, wherein the information terminal is a smartphone.

9. An in-vehicle system comprising:

an information terminal capable of executing a first application and a second application that are different from each other; and an in-vehicle device, wherein the in-vehicle device includes:

a communication interface connectable to the information terminal;

a display that, when the information terminal connects to the communication interface, displays an image based on an image signal received by the communication interface from the information terminal and resulting from processing of the first application by the information terminal; and an operation interface that accepts an operation on the image displayed by the display, the communication interface transmits an operation signal responsive to the operation accepted by the operation interface to the information terminal, and then receives an image signal resulting from processing of the first application by the information terminal in accordance with the operation signal from the information terminal, and the display does not display an image based on an image signal resulting from processing of the second application by the information terminal.

10. The in-vehicle system according to claim 9, wherein the in-vehicle device is a navigation device.

11. The in-vehicle system according to claim 9, wherein the information terminal is a smartphone.

* * * * *